(12) United States Patent
Guo et al.

(10) Patent No.: US 10,623,697 B2
(45) Date of Patent: Apr. 14, 2020

(54) DISPLAY PANEL, DISPLAY DEVICE AND IMAGE PICKUP METHOD THEREFOR

(71) Applicant: BOE TECHNOLOGY GROUP CO., LTD., Beijing (CN)

(72) Inventors: Yuzhen Guo, Beijing (CN); Xue Dong, Beijing (CN); Haisheng Wang, Beijing (CN); Yingming Liu, Beijing (CN); Xiaoliang Ding, Beijing (CN); Chun Wei Wu, Beijing (CN); Chih-Jen Cheng, Beijing (CN); Yanling Han, Beijing (CN); Rui Xu, Beijing (CN); Changfeng Li, Beijing (CN); Yunke Qin, Beijing (CN); Pinchao Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 55 days.

(21) Appl. No.: 15/773,755

(22) PCT Filed: Oct. 10, 2017

(86) PCT No.: PCT/CN2017/105526
§ 371 (c)(1),
(2) Date: May 4, 2018

(87) PCT Pub. No.: WO2018/161563
PCT Pub. Date: Sep. 13, 2018

(65) Prior Publication Data
US 2019/0260963 A1  Aug. 22, 2019

(30) Foreign Application Priority Data
Mar. 10, 2017  (CN) .......................... 2017 1 0142983

(51) Int. Cl.
*H04N 7/14* (2006.01)
*G09F 9/30* (2006.01)
*H04N 5/225* (2006.01)

(52) U.S. Cl.
CPC ............... *H04N 7/144* (2013.01); *G09F 9/30* (2013.01); *H04N 5/2251* (2013.01)

(58) Field of Classification Search
CPC ......... G09F 9/30; H04N 5/2251; H04N 7/144
See application file for complete search history.

(56) References Cited

U.S. PATENT DOCUMENTS 7,009,663 B2 *  3/2006  Abileah ............... G02F 1/13338
                                                    345/175
7,034,866 B1 *  4/2006  Colmenarez ........... H04N 3/155
                                                    348/14.07

(Continued)

FOREIGN PATENT DOCUMENTS

CN       1401186 A     3/2003
CN     102160370 A     8/2011

(Continued)

OTHER PUBLICATIONS

International Search Report dated Jan. 11, 2018.

*Primary Examiner* — Amy R Hsu
(74) *Attorney, Agent, or Firm* — Dilworth & Barrese, LLP; Michael J. Musella, Esq.

(57) ABSTRACT

A display panel, a display device and an image pickup method therefor are provided. The display panel includes a display region and an image pickup apparatus, wherein in a plan view of the display panel, at least a portion of the image pickup apparatus is located in the display region.

20 Claims, 5 Drawing Sheets

(56) References Cited

U.S. PATENT DOCUMENTS

| | | | | |
|---|---|---|---|---|
| 7,379,139 | B2* | 5/2008 | Yamazaki | G02F 1/1362 |
| | | | | 345/104 |
| 10,334,151 | B2* | 6/2019 | Romanenko | G06T 7/73 |
| 2002/0030768 | A1* | 3/2002 | Wu | G02F 1/13318 |
| | | | | 349/42 |
| 2010/0066800 | A1* | 3/2010 | Ryf | H04N 7/144 |
| | | | | 348/14.01 |
| 2011/0102308 | A1* | 5/2011 | Nakamura | H01L 27/14601 |
| | | | | 345/84 |
| 2014/0098184 | A1* | 4/2014 | Hughes | H01L 27/14621 |
| | | | | 348/14.16 |

FOREIGN PATENT DOCUMENTS

| | | |
|---|---|---|
| CN | 103901653 A | 7/2014 |
| CN | 205105320 U | 3/2016 |
| CN | 106019671 A | 10/2016 |
| CN | 106847092 A | 6/2017 |
| GB | 2273411 A | 6/1994 |
| WO | 2006109010 A1 | 10/2006 |

\* cited by examiner

DISPLAY PANEL, DISPLAY DEVICE AND IMAGE PICKUP METHOD THEREFOR

The present application claims priority of Chinese Patent Application No. 201710142983.6 filed on Mar. 10, 2017, the disclosure of which is incorporated herein by reference in its entirety as part of the present application.

TECHNICAL FIELD

Embodiments of the present disclosure relate to a display panel, a display device, and an image pickup method therefor.

BACKGROUND

At present, a front camera with an image acquiring function configured in a display device such as a mobile phone is generally located in a non-display region of a display screen, and the front camera takes up space in a peripheral region of the display screen, which is unfavorable for design of a narrow frame.

SUMMARY

An embodiment of the present disclosure provides a display panel, including a display region and an image pickup apparatus, wherein, in a plan view of the display panel, at least a portion of the image pickup apparatus is located in the display region.

For example, the display panel has a display surface, the image pickup apparatus includes: a plurality of imaging components and image sensors, the plurality of imaging components are located between the display surface and the image sensors, the plurality of imaging components include a plurality of substantially identical first imaging components and a plurality of substantially identical second imaging components, and the first imaging components and the second imaging components are configured to respectively image targets at different object distances to a same image plane.

For example, the first imaging component and the second imaging component are configured to have different maximum object distances at a same resolution.

For example, the image pickup apparatus further includes: a plurality of microlenses, located between the plurality of imaging components and the image sensors.

For example, a layer of the microlenses is located between the same image plane and the image sensor.

For example, the display panel further includes a plurality of display units located in the display region, wherein, the plurality of display units are located between the display surface and the image sensors.

For example, the plurality of display units include an opaque conductive layer, the plurality of first imaging components and the plurality of second imaging components are located in the opaque conductive layer.

For example, the display panel further includes a black matrix layer, wherein, the plurality of first imaging components and the plurality of second imaging components are located in the black matrix layer.

For example, each of the plurality of first imaging components and the plurality of second imaging components includes at least one of a hole or a convex lens.

For example, the hole has a hole diameter between 700 nm and 10 μm.

For example, the convex lens has a focal length between 1 μm and 20 μm.

For example, in the plan view, the display region includes a first sub-region and a second sub-region that do not overlap with each other, the plurality of first imaging components are located in the first sub-region, and the plurality of second imaging components are located in the second sub-region.

For example, each of the plurality of first imaging components and the plurality of second imaging components is a hole, respective first imaging components have a substantially identical first hole diameter, respective second imaging components have a substantially identical second hole diameter, and the first hole diameter is different from the second hole diameter.

For example, each of the plurality of first imaging components and the plurality of second imaging components is a convex lens, respective first imaging components have a substantially identical first focal length, respective second imaging components have a substantially identical second focal length, and the first focal length is different from the second focal length.

For example, the first region and the second region have substantially a same size, and the plurality of first imaging components and the plurality of second imaging components are equal in number.

For example, each of the display units comprises: a light emitting unit, and a pixel control circuit connected with the light emitting unit; and the opaque conductive layer is included in the pixel control circuit.

For example, image portions respectively formed by any two of the first imaging components on the same image plane do not overlap with each other, and image portions respectively formed by any two of the second imaging components on the same image plane do not overlap with each other.

For example, image portion formed by any one of the first imaging components and image portion formed by any one of the second imaging components on the same image plane do not overlap with each other.

Another embodiment of the present disclosure provides a display device, including any one of the above mentioned display panels.

Yet another embodiment of the present disclosure provides an image pickup method for a display device, wherein, the display device comprises a display panel, the display panel including a display region and an image pickup apparatus; in a plan view of the display panel, at least a portion of the image pickup apparatus is located in the display region, the display panel has a display surface, and the image pickup apparatus includes: a plurality of imaging components and image sensors, the plurality of imaging components being located between the display surface and the image sensors, the plurality of imaging components including a plurality of substantially identical first imaging components and a plurality of substantially identical second imaging components, and the first imaging component and the second imaging component being configured to respectively image targets at different object distances to a same image plane.

the method includes: by the plurality of first imaging components, forming a plurality of first image portions on the image plane; by the plurality of second imaging components, forming a plurality of second image portions on the image plane; by the image pickup apparatus, acquiring a plurality of first image signals and a plurality of second image signals, the plurality of first image signals and the plurality of first image portions are in one-to-one correspondence, and the plurality of second image signals and the plurality of second image portions are in one-to-one correspondence; processing the plurality of first image signals to obtain a first sub-image signal; processing the plurality of second image signals to obtain a second sub-image signal; and processing the first sub-image signal and the second sub-image signal to obtain a signal of an image having depth of field.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

When a user takes a selfie by using a front camera function of a display device such as a mobile phone, only a self-shooting gesture that the user looks at the front camera at the top of a display screen can make the user's vision in the selfie seem like looking forward. However, due to habits, when adjusting his/her own posture, the user tends to look at the display screen habitually, resulting in a problem of downward vision in the selfie.

Embodiments of the present disclosure provide a display panel, a display device, and an image pickup method therefor, so as to integrate an image acquiring function into a display screen, enhance user experience of the image acquiring function, and save space occupied by a frame of the display screen.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Thicknesses of respective film layers and sizes of region shapes in the accompanying drawings do not reflect true scales of the display panel and are only intended to illustrate the present disclosure.

An embodiment of the present disclosure provides a display panel, as shown in FIG. 1a to FIG. 1d, including: display units 100 and an image pickup apparatus 200 provided in a display region; wherein, the display panel 10 has a display surface S. The image pickup apparatus 200 includes: a plurality of image sensors 210 provided on a side of the respective display units 100 facing away from the display surface S, a plurality of imaging components 220 provided between the display units 100, and a plurality of microlenses 230 provided between the respective imaging components 220 and the respective image sensors 210.

The respective imaging components 220 are configured for imaging targets A1, A2, and A3 placed in front of the display surface of the display panel, after focused by the microlenses 230, onto corresponding image sensors 210; wherein, the respective imaging components 220 are divided into at least two categories. The imaging components 220 in different categories are configured to have different maximum object distances at a same resolution.

For example, in the above-described display panel provided by the embodiment of the present disclosure, the image pickup apparatuses 200 constituted by the image sensors 210, the imaging components 220 and the microlenses 230 are built in the display region of the display panel. On the one hand, space taken up by the front camera in a peripheral region of the display screen may be eliminated; and on the other hand, a better image can be obtained even if the user looks at the display region according to the habit when taking a selfie, which may improve the user experience.

For example, in the above-described display panel provided by the embodiment of the present disclosure, based on an imaging principle of the imaging component 220 provided between the display units 100, an image of a target placed in front of the display surface of the display panel is focused by the microlens 230 placed between the imaging component 220 and the image sensor 210, and then is projected to the image sensor 210. The focusing function of the microlens 230 replaces a relatively complex optical lens group constituted by a plurality of lenses cooperating with each other in a current camera device, which is favorable for integrating the image pickup apparatus 200 into the display region, to avoid excessively increasing a thickness of the display panel.

Figure 1A:
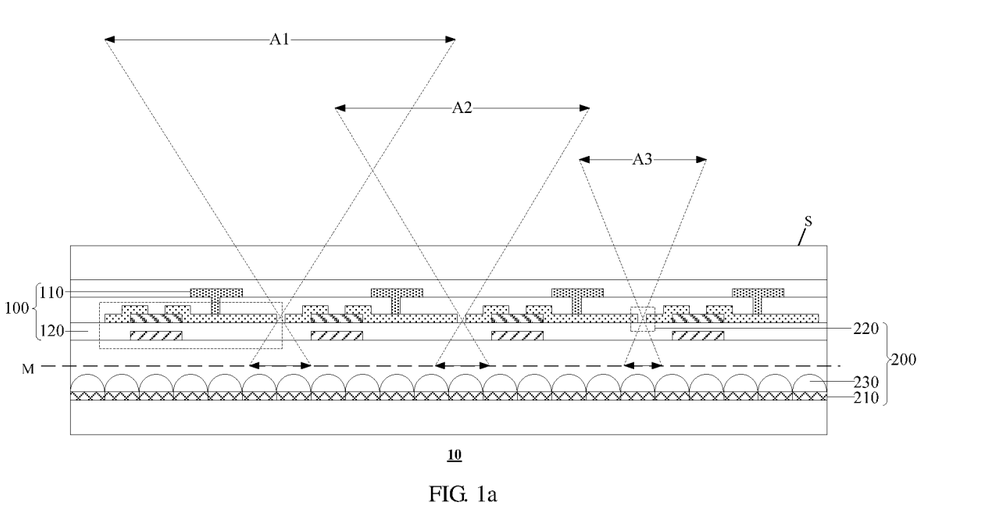
FIG. 1a to FIG. 1d are structural schematic diagrams of a display panel provided by an embodiment of the present disclosure, respectively.
Figure 1B:
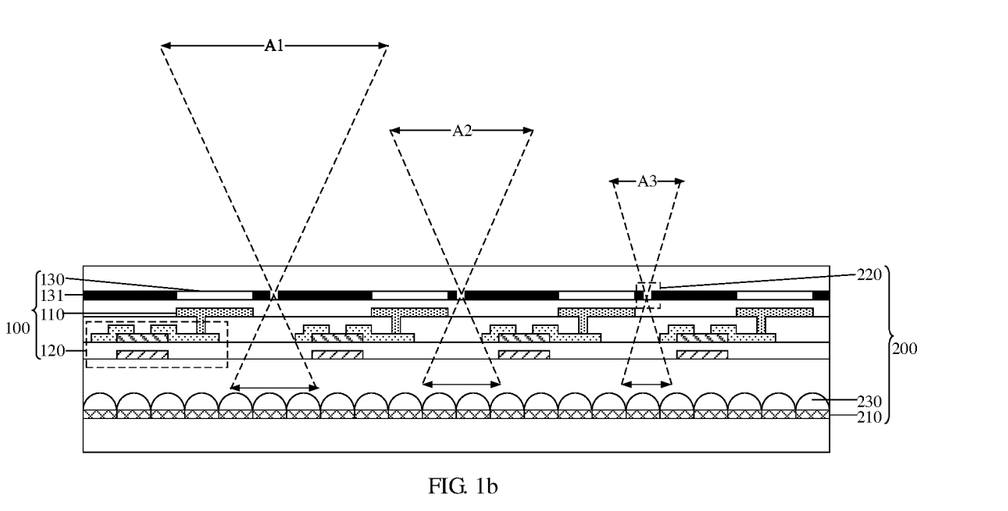
Figure 1C:
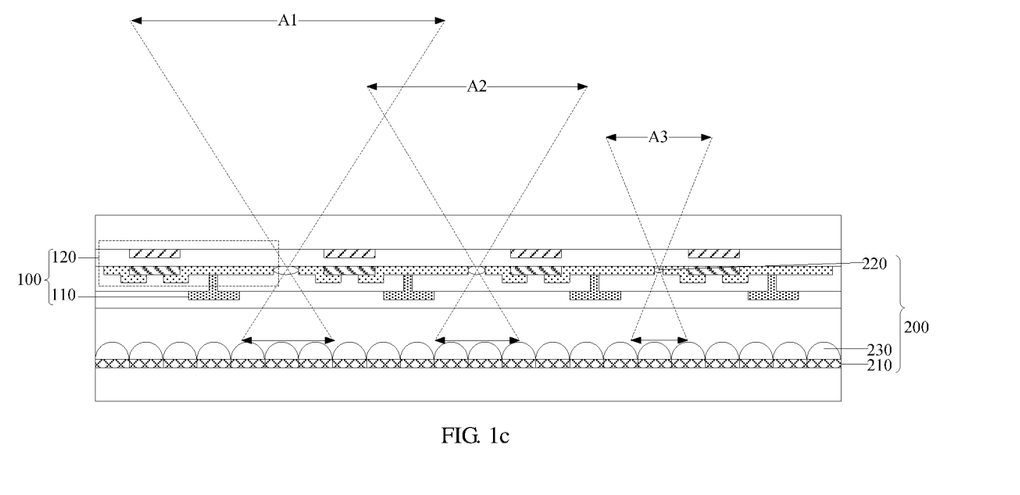

Further, the display unit 100 in the above-described display panel provided by the embodiment of the present disclosure is an active light emitting display unit, and as shown in FIG. 1a and FIG. 1c, the display unit 100 may include: a light emitting unit 110 and a pixel control circuit 120 connected with the light emitting unit 110. In order to avoid increasing steps of a fabricating process, the respective imaging components 220 may be provided in at least any one light shielding film layer in the pixel control circuit 120, for example, provided in a data line metal film layer as shown in FIG. 1a and FIG. 1c, and may also be provided in a gate line metal film layer; in addition, the imaging components 220 can be provided in an existed pattern of the light shielding film layer; for example, the imaging component 220 can be formed by a hole in the data line with a larger width; the imaging components 220 can also be provided in a blank region other than an existed light shielding film layer, which will not be limited here. Moreover, the imaging components 220 do not overlap with the light emitting unit 110.

Figure 1D:
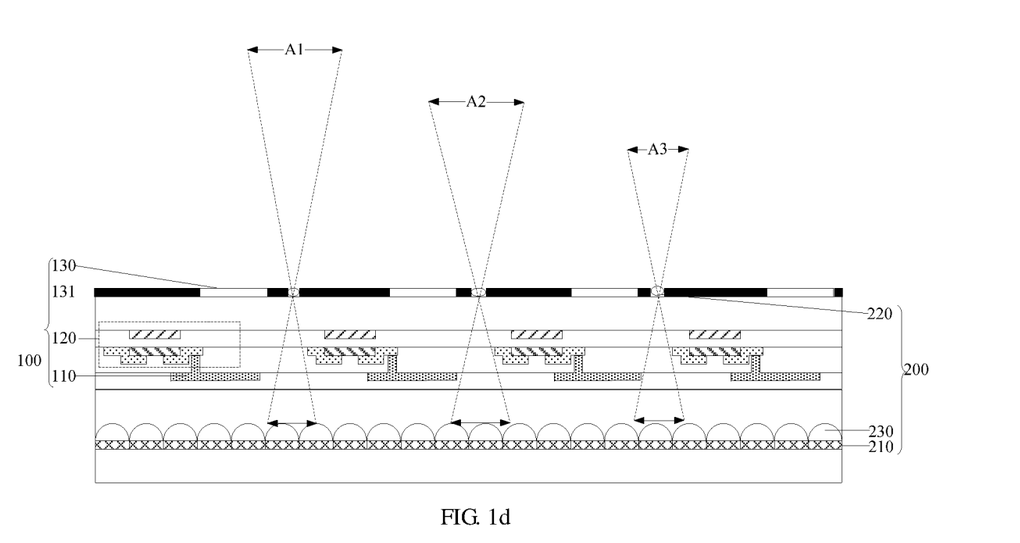

In addition, when the display unit 100 in the above-described display panel provided by the embodiment of the present disclosure uses a light emitting unit 110 emitting white light, except the light emitting unit 110 shown in FIG. 1a and FIG. 1c and the pixel control circuit 120 connected with the light emitting unit 110, the display panel further includes: an optical filter 130 as shown in FIG. 1b and FIG. 1d. In this case, in order to avoid increasing steps of the fabricating process, the respective imaging components 220 may further be provided in a black matrix 131 between two adjacent optical filters 130, for example, the black matrix 131 has a hole opened therein serving as the imaging component 220. It is noted that that FIG. 1b and FIG. 1d are merely schematic illustrations of components included in the respective display units 100, but do not represent true scales of the components.

For example, the display unit in the above-described display panel provided by the embodiment of the present disclosure may be of a top emission type, and may also be of a bottom emission type, which will not be limited herein. When the display unit is of the top emission type, in order to prevent display light of the display unit 100 from affecting image pickup, as shown in FIG. 1a and FIG. 1b, the image sensor 210 and the microlens 230 are provided on a side of the pixel control circuit 120 away from the light emitting unit 110. When the display unit is of the bottom emission type, in order to prevent the display light of the display unit 100 from affecting image pickup, as shown in FIG. 1c and FIG. 1d, the image sensor 210 and the microlens 230 are provided on a side of the light emitting unit 110 away from the pixel control circuit 120.

For example, in the above-described display panel provided by the embodiment of the present disclosure, the microlenses 230 and the image sensors 210 can be in an one-to-one correspondence, that is, one microlens 230 is provided above a receiving surface of one image sensor 210, which may enable light focused by the microlens 230 to be directly projected into a corresponding image sensor 210. Of course, the plurality of microlenses 230 can also correspond to one image sensor 210, which will not be limited here.

In addition, in the above-described display panel provided by the embodiment of the present disclosure, in order to implement a focusing function of the microlens 230, a spherical convex lens is generally used for fabricating the microlens 230, that is, the spherical convex lens is fabricated on the receiving surface of the image sensor 210. Thereafter, in order to ensure flatness of an upper surface of the microlens 230, to facilitate subsequent fabrication of other display film layers constituting the display unit 100 and the imaging component 220, it is generally necessary to form a transparent flat layer on the surface of the microlens 230, the transparent flat layer may be a transparent packaging film, and may also be other film layers, which will not be limited here.

For example, in order to avoid a problem that imaging light rays from adjacent imaging components 220 are transmitted to a same image sensor 210, causing imaging overlap and affecting subsequent processing of image signals, in the above-described display panel provided by the embodiment of the present disclosure, for example, the imaging component 220 is provided to correspond to the plurality of image sensors 210, that is, the plurality of image sensors 210 simultaneously receive the imaging light projected by one imaging component 220. According to a relative size between the imaging component 220 and the corresponding plurality of image sensors 210, the plurality of image sensors 210 corresponding to the one imaging component 220 may simultaneously receive a same image portion; or the plurality of image sensors 210 may respectively receive partial imaged portion which are then subjected to image splicing processing of the respective image sensors 210 to be synthesized as a complete image, which will not be limited here.

For example, in the above-described display panel provided by the embodiment of the present disclosure, the imaging component 220 may be implemented by, for example, a pinhole as shown in FIG. 1a and FIG. 1b, or by a convex lens as shown in FIG. 1c and FIG. 1d.

For example, when the pinhole is used as the imaging component 220, according to a pinhole imaging principle, an inverted and reduced real image of an object is formed on an imaging receiving screen on the other side of the pinhole. In addition, a hole diameter of the pinhole must not be too small and needs to be at least several orders of magnitude higher than a wavelength of light, to ensure that no diffraction occurs. Therefore, in the above-described display panel provided by the embodiment of the present disclosure, the hole diameter of the pinhole is generally controlled between 700 nm and 10 μm.

Figure 2:
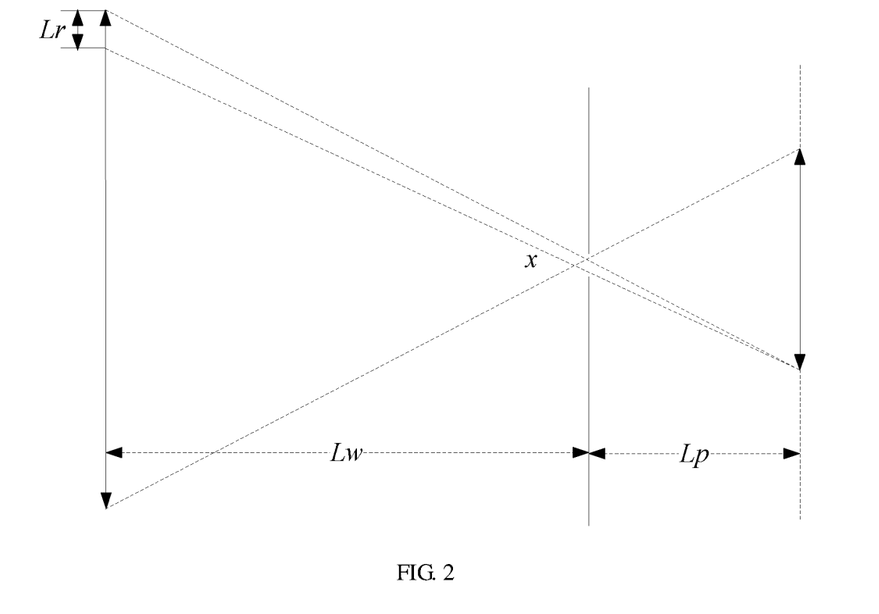
FIG. 2 is a pinhole imaging principle diagram I when an imaging component in the display panel provided by the embodiment of the present disclosure is a pinhole.

On such basis, by increasing the hole diameter of the pinhole, resolution of imaging can be adjusted. As shown in FIG. 2, if it is necessary to distinguish two points having a distance of Lr at an object distance of Lw, then a hole diameter x of the pinhole may be obtained according to a formula: $x/Lr = Lp/(Lp+Lw)$, where, Lp is an image distance. If the object distance of the object is beyond Lw, the two points having the distance of Lr cannot be distinguished; and if the object distance of the object is within Lw, two points having a distance less than Lr can be distinguished. That is, when the hole diameter of the pinhole is x, it can be ensured that two points having a distance ≤Lr on the object having the object distance within Lw can be distinguished. By increasing the hole diameter x of the pinhole, it is possible to ensure resolution of two points having the distance of Lr on a farther object. This is a basis that the display screen may be adjusted by adjusting the hole diameter of the pinhole so as to obtain clear images of objects with different object distances.

Similarly, when the convex lens is used as the imaging component 220, according to an imaging principle of the convex lens, from a formula below: $1/u+1/v=1/f$, where, u, v, and f are respectively an object distance, an image distance, and a focal length, it can be known that, in the display panel provided by the embodiment of the present disclosure, since the image distance v of the convex lens is constant, it is necessary to image objects of different object distances u at a same image distance v, so adjusting the focal length f of the convex lens may correspond to imaging targets under different object distances u. That is, for example, the larger the focal length f of the convex lens, the larger the maximum object distance u corresponding to the convex lens at a preset resolution. For example, the focal length of the convex lens is between 1 μm and 20 μm.

Figure 3:
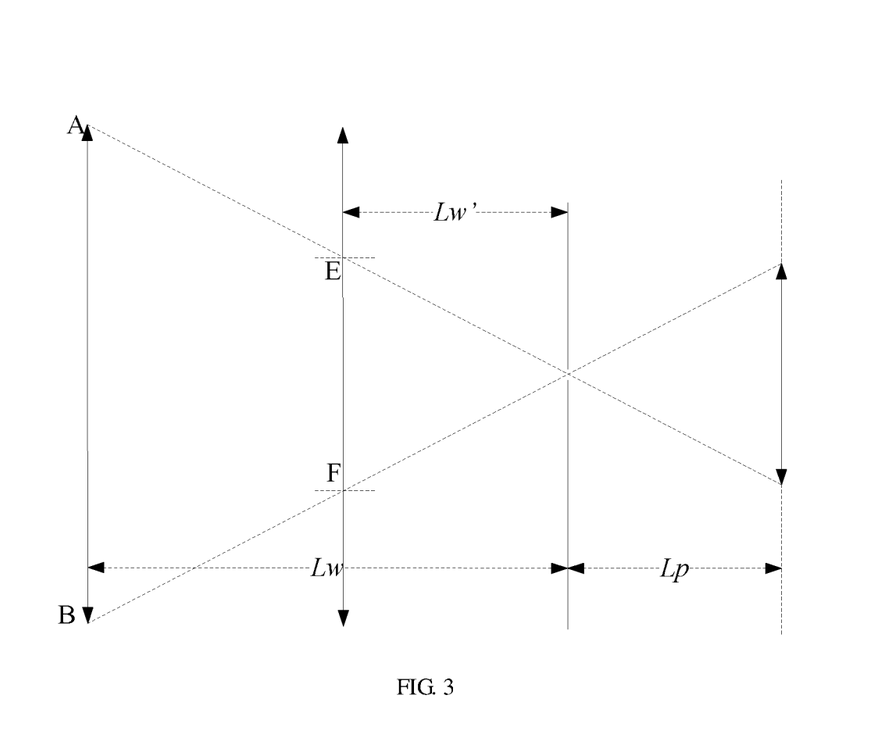
FIG. 3 is a pinhole imaging principle diagram II when an imaging component in the display panel provided by the embodiment of the present disclosure is a pinhole.

Further, for example, in order to ensure that the imaging component 220 that imaging of a target with a smaller image distance has a larger visual field, in an implementation mode of the above-described display panel provided by the embodiment of the present disclosure, the larger the hole diameter of the pinhole needed, the smaller the maximum object distance corresponding to the pinhole at the preset resolution. For example, considering reasons as below: as shown in FIG. 3, although a pinhole with a fixed smaller hole diameter can ensure resolution of all objects having a distance of Lr within a range of the object distance Lw, yet when an object AB moves from a position at the object distance Lw which may be completely captured and imaged by the pinhole to a position at an object distance Lw', only a portion EF can be captured by the pinhole, that is, the remaining portion of the object is outside a visual field of the pinhole. Although a plurality of pinholes can be arranged to expand the visual field, yet it may result in designing a pinhole region with a relatively high distribution density for capturing an object with a smaller object distance, to cause a situation of non-uniform distribution density of the pinholes and inconsistency with distribution of non-luminous regions of the display unit 100, which, thus, affects design of the light emitting region. On such basis, in the above-described display panel provided by the embodiment of the present disclosure, objects with different object distances are imaged by using pinholes with different hole diameters, the pinhole with larger hole diameter corresponds to larger visual field, and can image a target with a smaller object distance, so that the distribution density of the pinholes is not so much limited.

On such basis, in the above-described display panel provided by the embodiment of the present disclosure, the imaging components 220 are divided into at least two categories, different categories of imaging components 220 are configured to have different maximum object distances at a same resolution, and their corresponding image sensors 210 respectively perform imaging of targets with different object distances. In this way, when images are being acquired, most clear images are selected among images acquired by respective image sensors corresponding to a same category of imaging components, and then spliced and synthesized to obtain sub-images; sub-images obtained by different categories of imaging components are fused and synthesized into complete imaging having a depth of field, to implement a function of acquiring a clear image with respect to targets with different object distances.

Figure 4:
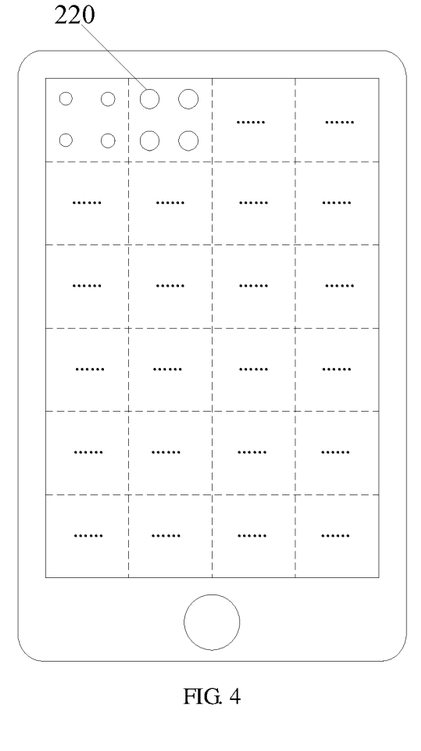
FIG. 4 is a structural schematic diagram of regions of the display panel provided by the embodiment of the present disclosure.

For example, in order to facilitate the image sensors corresponding to different categories of imaging components 220 to respectively perform imaging of targets with different object distances, in the above-described display panel provided by the embodiment of the present disclosure, as shown in FIG. 4, the display panel may be divided into a plurality of regions arranged in an array, each region having a same category of imaging components 220, so that the regions respectively perform imaging of targets with different object distances; and in FIG. 4, one dashed line box represents one region.

For example, when the imaging component 220 is a pinhole, respective pinholes in a same region have a same hole diameter, and pinholes in adjacent two regions have different hole diameters; when the imaging component 220 is a convex lens, focal lengths of respective convex lenses in a same region are the same, and focal lengths of convex lenses in two adjacent regions are different. Of course, the imaging component 220 can include both the pinholes and the convex lenses at a same time, as long as they are set according to optical characteristic parameters of the imaging component 220, which can also achieve the above-described technical effects, and will not be limited here.

Figure 5:
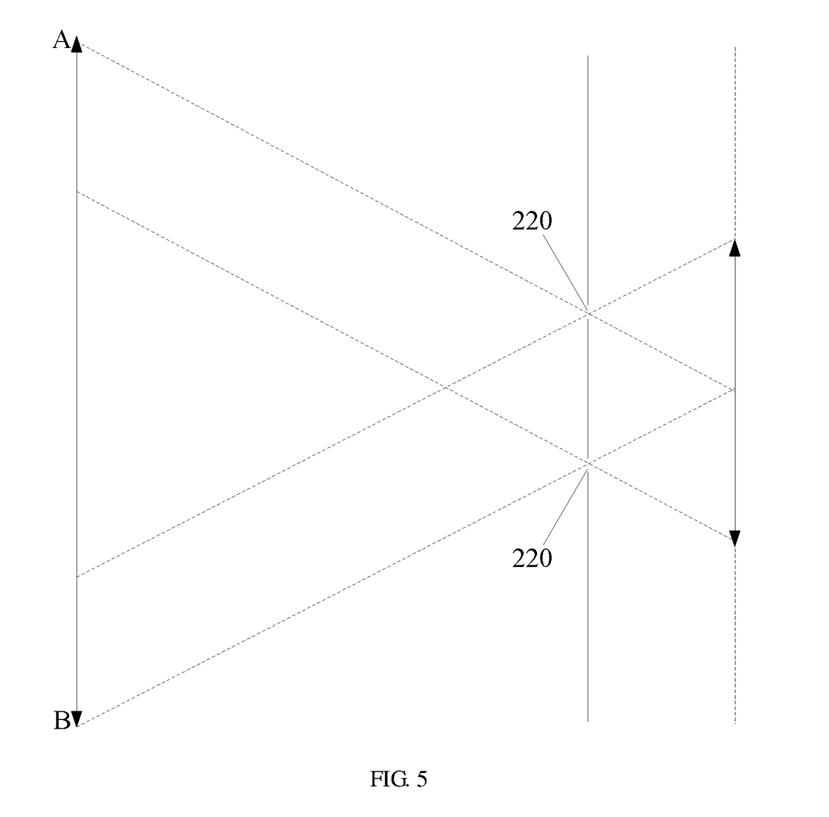
FIG. 5 is a schematic diagram of combined imaging of the imaging components in the display panel provided by the embodiment of the present disclosure.

Moreover, for example, in the above-described display panel provided by the embodiment of the present disclosure, distribution densities of the imaging components 220 in respective regions are consistent. For example, an appropriate number of imaging components 220 of a same category may be provided in respective regions, as shown in FIG. 5, each imaging component 220 is responsible for imaging a portion of a target object, and images imaged by a plurality of imaging components 220 are merged on the image receiving screen, i.e., the image sensor 210, so as to play a role in expanding the visual field.

Based on a same inventive concept, an embodiment of the present disclosure further provides a display device, comprising the above-described display panel provided by the embodiment of the present disclosure; the display device may be: a mobile phone, a tablet computer, a television, a display, a notebook computer, a digital photo frame, a navigator, and any other product or component having a display function. For implementation of the display device, the embodiment of the above-described display panel may be referred to, and repeated description is omitted.

Figure 6:
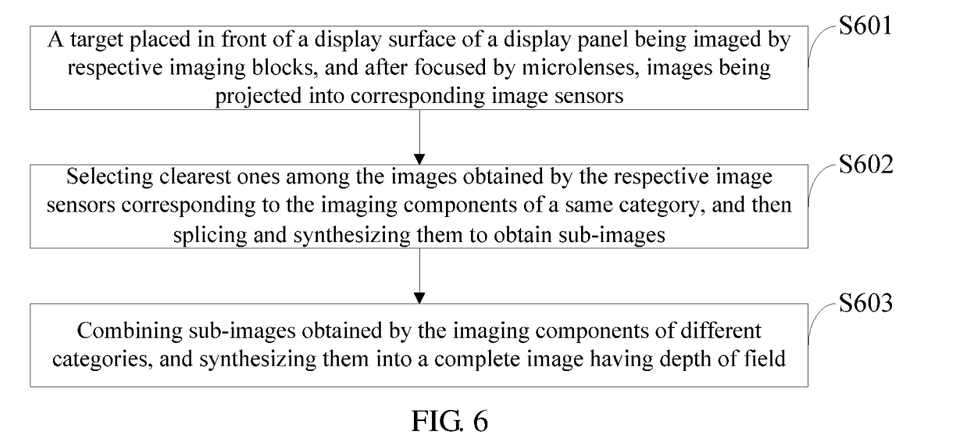
FIG. 6 is a flow chart of an image pickup method for a display panel provided by an embodiment of the present disclosure.

An embodiment of the present disclosure further provides an image pickup method for the above-described display device, and as shown in FIG. 6, the method includes steps of:

S601: a target placed in front of a display surface of a display panel is imaged by respective imaging components and then focused by microlenses, images being projected onto corresponding image sensors;

S602: selecting clearest ones among the images picked up by the respective image sensors corresponding to the imaging components of a same category, and then splicing and synthesizing them to obtain sub-images;

S603: combining sub-images obtained by the imaging components of different categories, and synthesizing them into a complete image having depth of field.

In the display panel, the display device and the method for acquiring the image thereof provided by the embodiments of the present disclosure, the image sensor is provided on the side away from the display surface of the display unit, based on the imaging principle of the imaging component arranged between the display units, the image of the target placed in front of the display surface of the display panel is focused by the microlens placed between the imaging component and the image sensor, and then is projected into the image sensor. The imaging components are divided into at least two categories; different categories of imaging components are configured to have different maximum object distances at the same resolution, and their corresponding image sensors respectively perform imaging of the targets with different object distances. When the images are being acquired, the most clear images are selected among the images acquired by the respective image sensors corresponding to the same category of imaging components, and then spliced and synthesized to obtain the sub-images; the sub-images obtained by different categories of imaging components are combined and synthesized into complete imaging having a depth of field, to implement the function of acquiring the clear image with respect to the targets with different object distances.

It is evident that one person skilled in the art can make various changes or modifications to the present disclosure without departure from the spirit and scope of the present disclosure. Thus, if these changes and modifications to the present disclosure are within the scope of the claims of the present disclosure and equivalent technologies, the present disclosure also intends to include all such changes and modifications within its scope.

The foregoing embodiments merely are exemplary embodiments of the present disclosure, and not intended to define the scope of the present disclosure, and the scope of the present disclosure is determined by the appended claims.

The invention claimed is:

1. A display panel, comprising a display region and an image pickup apparatus, wherein, in a plan view of the display panel, at least a portion of the image pickup apparatus is located in the display region, wherein the display panel has a display surface, the image pickup apparatus includes; a plurality of imaging components and image sensors, the plurality of imaging components are located between the display surface and the image sensors, the plurality of imaging components include a plurality of substantially identical first imaging components and a plurality of substantially identical second imaging components, and the first imaging components and the second imaging components are configured to respectively image targets at different object distances to a same image plane, wherein the display panel further comprises a plurality of display units located in the display region, wherein, the plurality of display units are located between the display surface and the image sensors, wherein the plurality of display units include an opaque conductive layer, the plurality of first imaging components and the plurality of second imaging components are located in the opaque conductive layer, wherein each of the display units comprises: a light emitting unit, and a pixel control circuit connected with the light emitting unit; and the opaque conductive layer is included in the pixel control circuit.

2. The display panel according to claim 1, wherein, the first imaging component and the second imaging component are configured to have different maximum object distances at a same resolution.

3. The display panel according to claim 1, wherein, the image pickup apparatus further includes: a plurality of microlenses, located between the plurality of imaging components and the image sensors.

4. The display panel according to claim 3, wherein, a layer of the microlenses is located between the same image plane and the image sensor.

5. The display panel according to claim 1, further comprising a black matrix layer, wherein, the plurality of first imaging components and the plurality of second imaging components are located in the black matrix layer.

6. The display panel according to claim 1, wherein, each of the plurality of first imaging components and the plurality of second imaging components includes at least one of a hole or a convex lens.

7. The display panel according to claim 6, wherein, the hole has a hole diameter between 700 nm and 10 μm.

8. The display panel according to claim 6, wherein, the convex lens has a focal length between 1 μm and 20 μm.

9. The display panel according to claim 1, wherein,
in the plan view, the display region includes a first sub-region and a second sub-region that do not overlap with each other, the plurality of first imaging components are located in the first sub-region, and the plurality of second imaging components are located in the second sub-region.

10. The display panel according to claim 9, wherein,
each of the plurality of first imaging components and the plurality of second imaging components is a hole, respective first imaging components have a substantially identical first hole diameter, respective second imaging components have a substantially identical second hole diameter, and the first hole diameter is different from the second hole diameter.

11. The display panel according to claim 9, wherein,
each of the plurality of first imaging components and the plurality of second imaging components is a convex lens, respective first imaging components have a substantially identical first focal length, respective second imaging components have a substantially identical second focal length, and the first focal length is different from the second focal length.

12. The display panel according to claim 9, wherein, the first region and the second region have substantially a same size, and the plurality of first imaging components and the plurality of second imaging components are equal in number.

13. The display panel according to claim 1, wherein, image portions respectively formed by any two of the first imaging components on the same image plane do not overlap with each other, and image portions respectively formed by any two of the second imaging components on the same image plane do not overlap with each other.

14. The display panel according to claim 13, wherein, image portion formed by any one of the first imaging components and image portion formed by any one of the second imaging components on the same image plane do not overlap with each other.

15. A display device, comprising the display panel according to claim 1.

16. An image pickup method for a display device, wherein, the display device comprises a display panel, the display panel including a display region and an image pickup apparatus; in a plan view of the display panel, at least a portion of the image pickup apparatus is located in the display region, the display panel has a display surface, and the image pickup apparatus includes: a plurality of imaging components and image sensors, the plurality of imaging components being located between the display surface and the image sensors, the plurality of imaging components including a plurality of substantially identical first imaging components and a plurality of substantially identical second imaging components, and the first imaging component and the second imaging component being configured to respectively image targets at different object distances to a same image plane;

the method comprises:
by the plurality of first imaging components, forming a plurality of first image portions on the image plane;
by the plurality of second imaging components, forming a plurality of second image portions on the image plane;
by the image pickup apparatus, acquiring a plurality of first image signals and a plurality of second image signals, the plurality of first image signals and the plurality of first image portions are in one-to-one correspondence, and the plurality of second image signals and the plurality of second image portions are in one-to-one correspondence;
processing the plurality of first image signals to obtain a first sub-image signal;
processing the plurality of second image signals to obtain a second sub-image signal; and
processing the first sub-image signal and the second sub-image signal to obtain a signal of an image having depth of field.

17. A display panel, comprising a display region and an image pickup apparatus, wherein, in a plan view of the display panel, at least a portion of the image pickup apparatus is located in the display region,
wherein the display panel has a display surface, the image pickup apparatus includes: a plurality of imaging components and image sensors, the plurality of imaging components are located between the display surface and the image sensors, the plurality of imaging components include a plurality of substantially identical first imaging components and a plurality of substantially identical second imaging components, and the first imaging components and the second imaging components are configured to respectively image targets at different object distances to a same image plane, wherein the first imaging component and the second imaging component are configured to have different maximum object distances at a same resolution.

18. The display panel according to claim 17, wherein, each of the plurality of first imaging components and the plurality of second imaging components includes at least one of a hole or a convex lens.

19. The display panel according to claim 18, wherein, the hole has a hole diameter between 700 nm and 10 μm.

20. The display panel according to claim 18, wherein, the convex lens has a focal length between 1 μm and 20 μm.

* * * * *